(12) United States Patent
Bhattacharya et al.

(10) Patent No.: US 11,770,389 B2
(45) Date of Patent: Sep. 26, 2023

(54) DYNAMIC REKEYING OF IPSEC SECURITY ASSOCIATIONS

(71) Applicant: VMWARE, INC., Palo Alto, CA (US)

(72) Inventors: Sourabh Bhattacharya, Pune (IN); Yong Wang, Palo Alto, CA (US); Awan Kumar Sharma, Pune (IN); Bhargav Puvvada, Pune (IN); Mayur Katke, Pune (IN)

(73) Assignee: VMWARE, INC., Palo Alto, CA (US)

( * ) Notice: Subject to any disclaimer, the term of this patent is extended or adjusted under 35 U.S.C. 154(b) by 331 days.

(21) Appl. No.: 17/012,235

(22) Filed: Sep. 4, 2020

(65) Prior Publication Data

US 2022/0021687 A1 Jan. 20, 2022

(30) Foreign Application Priority Data

Jul. 16, 2020 (IN) .............................. 202041030417

(51) Int. Cl.
*H04L 9/40* (2022.01)
*H04L 47/125* (2022.01)
*H04L 9/08* (2006.01)

(52) U.S. Cl.
CPC ........ *H04L 63/1416* (2013.01); *H04L 9/0891* (2013.01); *H04L 47/125* (2013.01); *H04L 63/029* (2013.01); *H04L 63/0485* (2013.01); *H04L 63/20* (2013.01)

(58) Field of Classification Search
CPC . H04L 63/1416; H04L 9/0891; H04L 47/125; H04L 63/029; H04L 63/0485; H04L 63/20
See application file for complete search history.

(56) References Cited

U.S. PATENT DOCUMENTS

| | | | | |
|---|---|---|---|---|
| 6,591,265 B1* | 7/2003 | Erickson | ............... | H04L 63/102 707/999.005 |
| 7,886,143 B2* | 2/2011 | Qi | ........................ | G09C 1/00 380/42 |
| 8,028,161 B2* | 9/2011 | Kroselberg | ........... | H04L 63/168 713/169 |

(Continued)

FOREIGN PATENT DOCUMENTS

| | | | | |
|---|---|---|---|---|
| CN | 100525178 C | * | 8/2009 | |
| JP | 2004104542 A | * | 4/2004 | ........... H04L 63/061 |

*Primary Examiner* — John B King
(74) *Attorney, Agent, or Firm* — Patterson + Sheridan, LLP (57) ABSTRACT

Certain embodiments described herein are relate to a method for dynamically rekeying a security association. The method includes establishing, by a destination tunnel endpoint (TEP), an in-bound security association with a source TEP, with a first security parameter index (SPI) value, for encrypting data packets communicated between the source TEP and the destination TEP. The method further includes rekeying, by the destination TEP, the in-bound security association, the rekeying including generating a second SPI value for replacing the first SPI value based on a trigger event relating to at least one of a real-time security score of the in-bound security association, a number of security associations assigned to a compute resource that the in-bound security resource is assigned to, an amount of load managed by the compute resource that the in-bound security resource is assigned to, and an indication received from an administrator.

24 Claims, 4 Drawing Sheets

(56) References Cited

U.S. PATENT DOCUMENTS

| | | | |
|---|---|---|---|
| 8,191,134 B1* | 5/2012 | Thangavelu | H04L 63/0485 726/8 |
| 10,516,652 B1* | 12/2019 | Hashmi | H04L 63/061 |
| 11,418,434 B2* | 8/2022 | Acharya | H04L 63/20 |
| 2003/0061505 A1* | 3/2003 | Sperry | H04L 63/061 726/14 |
| 2005/0273606 A1* | 12/2005 | Ueda | H04L 63/164 713/168 |
| 2007/0254677 A1* | 11/2007 | Venkitaraman | H04W 68/00 455/458 |
| 2010/0235620 A1* | 9/2010 | Nylander | H04L 63/205 713/153 |
| 2010/0318799 A1* | 12/2010 | Simon | H04L 63/061 713/171 |
| 2010/0318800 A1* | 12/2010 | Simon | H04L 9/0869 713/171 |
| 2015/0121123 A1* | 4/2015 | Bath | G06F 9/5083 714/4.11 |
| 2015/0242594 A1* | 8/2015 | Harjula | G06F 21/57 726/2 |
| 2015/0363769 A1* | 12/2015 | Ronca | G06Q 20/381 705/64 |
| 2016/0212098 A1* | 7/2016 | Roch | H04L 63/029 |
| 2017/0126626 A1* | 5/2017 | Datta | H04L 63/0272 |
| 2017/0359265 A1* | 12/2017 | Bosch | H04L 67/1076 |
| 2019/0036894 A1* | 1/2019 | Wang | H04L 63/166 |
| 2019/0173841 A1* | 6/2019 | Wang | G06F 9/5083 |
| 2019/0173920 A1* | 6/2019 | Gopal | H04L 63/205 |
| 2019/0327112 A1* | 10/2019 | Nandoori | H04L 47/125 |
| 2019/0387049 A1* | 12/2019 | Patil | H04L 67/1029 |
| 2020/0396239 A1* | 12/2020 | Kaidi | H04L 63/1416 |
| 2021/0136049 A1* | 5/2021 | Wang | H04L 63/0272 |
| 2021/0143997 A1* | 5/2021 | Piriyath | H04L 63/0272 |
| 2021/0266147 A1* | 8/2021 | Zee | H04L 9/0833 |
| 2021/0329023 A1* | 10/2021 | Mohammad | H04L 63/1466 |
| 2021/0359853 A1* | 11/2021 | Dalton | G06F 9/451 |

\* cited by examiner

| VCPUs 225 | VCPU 1 | VCPU 2 | VCPU 3 | VCPU 4 | ... | VCPU (n-1) |
|---|---|---|---|---|---|---|
| Load | 100 | 99 | 96 | 94 | ... | 92 |
| SA List | SA List 1 | SA List 2 | SA List 3 | SA List 4 | ... | SA List 5 |

| VCPUs 225 | VCPU 1 | VCPU 2 | VCPU 3 | VCPU 4 | ... | VCPU (n-1) |
|---|---|---|---|---|---|---|
| # of SAs | 302 | 300 | 298 | 297 | ... | 295 |
| SA List | SA List 1 | SA List 2 | SA List 3 | SA List 4 | ... | SA List 5 |

| SAs | Replay Packet Count | Decryption Failure Count | Elapsed Lifetime | Security Score |
|---|---|---|---|---|
| SA1 | 0.1 | 0.2 | 0.9 | 0.27 |
| SA2 | 0.2 | 0.3 | 0.7 | 0.35 |
| ... | ... | ... | ... | ... |
| SAn | 0.01 | 0.01 | 0.8 | 0.016 |

DYNAMIC REKEYING OF IPSEC SECURITY ASSOCIATIONS

RELATED APPLICATIONS

Benefit is claimed under 35 U.S.C. 119(a)-(d) to Foreign Application Serial No. 202041030417 filed in India entitled "DYNAMIC REKEYING OF IPSEC SECURITY ASSOCIATIONS", on Jul. 16, 2020, by VMware, Inc., which is herein incorporated in its entirety by reference for all purposes.

This application, describes an invention that, in certain embodiments, represents a patentably-distinct improvement to U.S. patent application Ser. No. 16/802,580 filed Feb. 27, 2020, but additionally has separate utility to improve security of encrypted network communication.

BACKGROUND

IP security protocols are widely used to protect packets communicated between endpoints (EPs), such as over the Internet, between gateways, between data centers (e.g., on premises data centers, cloud data centers, etc.), within data centers, etc. For example, security associations (SAs) may be established between the endpoints. In some embodiments, each SA defines security parameters for a one-way or simplex connection, and therefore at least two security associations, one for each direction, are established between two IPSec peers (e.g., endpoints). These security associations are a form of contract between the endpoints detailing how to exchange and protect information among each other. Each SA is comprised of a mutually agreed-upon key, one or more security protocols, and a security parameter index (SPI) value. After security associations have been established between two endpoints, an IPSec encryption protocol may be used to protect data packets for transmission.

For IPSec in the Encapsulating Security Payload (ESP) tunnel mode, tunnel endpoints ("TEPs") are used for applying IPSec protocols to encrypt and encapsulate egress packets from a source endpoint and decrypt and decapsulate ingress packets for a destination endpoint to secure communication between the endpoints. For example, a source endpoint may generate and route egress IP packets to a source TEP associated with the source endpoint. In particular, the source endpoint may generate an IP packet including a header with the IP address of the source endpoint set as the source IP address and the IP address of the destination endpoint set as the destination IP address. A MAC address of the source TEP may further be set as a next-hop MAC address of the IP packet in the header.

The source TEP receives the IP packet and encrypts the original IP packet including the header of the original IP packet based on a SA established between the source TEP and the destination TEP. For example, the source TEP encrypts the original IP packet with a mutually agreed-upon key defined by the security association. The source TEP further encapsulates the encrypted packet by adding a new IP header and an ESP header to the encrypted packet to generate an encapsulated ESP encrypted data packet. The ESP header includes an SPI value corresponding to the SA used to encrypt the packet. The new IP header includes a source IP address of the source TEP and a destination IP address of the destination TEP. The new IP header is used to forward the encapsulated ESP encrypted data packet through a network from the source TEP to the destination TEP.

The destination TEP may then decapsulate and decrypt the encapsulated ESP encrypted data packet to extract the original IP packet. For example, the destination TEP may determine the SA (e.g., mutually agreed-upon key) to use to decrypt the encapsulated ESP encrypted data packet based on the SPI value included in the ESP header. Based on the destination IP address in the header of the original IP packet, the destination TEP forwards the original IP packet to the destination endpoint.

SUMMARY

Herein described are one or more embodiments of a method for dynamically rekeying a security association. The method includes establishing, by a destination tunnel endpoint (TEP), an in-bound security association with a source TEP, with a first security parameter index (SPI) value, for encrypting data packets communicated between the source TEP and the destination TEP. The method further includes rekeying, by the destination TEP, the in-bound security association, the rekeying including generating a second SPI value for replacing the first SPI value based on a trigger event relating to at least one of a real-time security score of the in-bound security association, a number of security associations assigned to a compute resource that the in-bound security association is assigned to, an amount of load managed by the compute resource that the in-bound security association is assigned to, and an indication received from an administrator.

Also described herein are embodiments of a computer system including a memory comprising executable instructions and a processor in data communication with the memory and configured to execute the instructions to cause the computer system to perform a method described above for dynamically rekeying a security association.

Also described herein are embodiments of a non-transitory computer readable medium comprising instructions to be executed in a computer system, wherein the instructions when executed in the computer system perform the method described above for dynamically rekeying a security association

DETAILED DESCRIPTION

Figure 1:
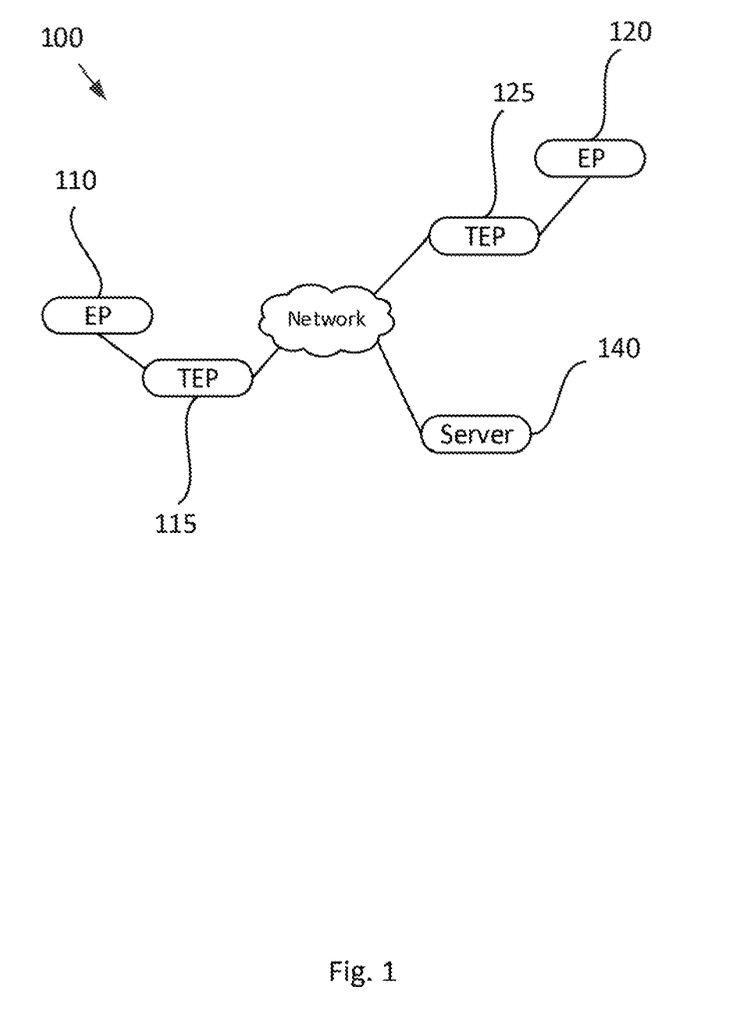
FIG. 1 illustrates an example of a network, in accordance to some embodiments.

FIG. 1 illustrates an example of a network 100, representing a physical network. As shown by FIG. 1, network 100 connects a plurality of tunnel endpoints (TEPs), including TEP 115 and TEP 125, and a server 140. In certain embodiments, a TEP may be a physical computing device (e.g., physical server, physical host). In certain embodiments, a TEP may be a virtualized computing instance (e.g., virtual machine, container, data compute node, isolated user space instance, etc.) as further discussed herein. A TEP may also be referred to as an IPSec gateway.

TEPs 115 and 125 may connect endpoints (EPs), including EP 110 and EP 120, for example, to stretch a network across geographically distant sites. An EP refers generally to an originating EP ("source EP") or terminating EP ("destination EP") of a flow of network packets, which can include one or more data packets passed from the source to the destination EP. In practice, an EP may be a physical computing device (e.g., physical server, physical host). In certain embodiments, an EP may be a virtualized computing instance (e.g., virtual machine, container, data compute node, isolated user space instance) as further discussed herein.

In network 100, EPs may communicate with or transmit data packets to other EPs via tunnel endpoints (TEPs) as discussed. For example, EP 110 may transmit a data packet to EP 120 in a secured fashion via TEPs 115 and 125, acting as a source TEP and a destination TEP, respectively. TEPs 115 and 125 may implement IPSec protocols, including ESP tunnel mode, to secure communication between one another. In some embodiments, before any data can be securely transferred between EPs 110 and 120 using the IPSec framework, SAs (including a mutually agreed-upon key, information for one or more security protocols, and/or a SPI value) may need to be established between TEPs 115 and 125. In some embodiments, the SAs may be established by TEPs 115 and 125 on behalf of EPs 110 and 120.

The mutually agreed-upon encryption/decryption keys, in some embodiments, is generated by a server 140 and subsequently distributed to TEPs 115 and 125 associated with the EPs 110 and 120. Other mechanisms for generating mutually agreed-upon keys are possible as well. The one or more security protocols, described above, may be one or more IPSec security protocols such as Authentication Header (AH), Encapsulating Security Payload (ESP), etc. After security associations have been established for the two EPs 110 and 120, one or more of these security protocols may be used to protect data packets for transmission. Though certain embodiments are described herein with respect to the ESP security protocol, other suitable IPSec security protocols (e.g., AH protocol) alone or in combination with ESP, may be used in accordance with the embodiments described herein. Further, the embodiments described herein may similarly be used for different types of traffic such as IPv4, IPv6, etc. In certain embodiments, the techniques herein can be used to hash ESP packets encapsulated in other packet types (e.g., VXLAN or Geneve).

In addition to a mutually agreed-upon key and security protocol, a SA includes an SPI value. In some embodiments, each SPI value is a binary value associated with a security association, which enables a TEP to distinguish among multiple active security associations. As an example, SPI values may be used to distinguish between the inbound and outbound security associations of different EPs. In some cases, the Internet Key Exchange (IKE) protocol is used to generate these SPI values and encryption/decryption keys in the IPSec framework. For example, prior to any data exchange, IKE performs a two-phase negotiation session, which results in establishing two security associations between two IPSec peers (e.g., TEPs). These security associations may not only contain mutually agreed-upon encryption and decryption keys to be used for incoming and outgoing traffic (e.g., of an EP), but also maintain sequence numbers for each data transfer. These sequence numbers are maintained to ensure anti-replay, which prevents hackers from injecting or making changes in data packets that travel from a source to a destination TEP.

In some cases, instead of using IKE, distributed network encryption (DNE) may be utilized to simplify key management, including key generation and exchange, and SPI allocation. An example implementation of DNE with key management is described in U.S. Patent Application Publication 2018/0063103, published Mar. 1, 2018, and which is incorporated herein by reference in its entirety. DNE provides a central unit, e.g. server 140, that generates and distributes encryption/decryption keys and SPI values for EPs to TEPs in a network. DNE also simplifies protecting network traffic of TEPs by allowing users (e.g., network administrators) to define simple security rules and key policies. For example, in some embodiments, server 140 may store, in its memory, a plurality of security rules and key policies. Security rules may be user-defined rules that users input into the central unit through an interface (e.g., via a manager, which may be a physical computing device or a virtualized computing instance supported by a physical computing device). Security rules may define what key policy is used by server 140 to generate an encryption/decryption key for data transfer between TEPs for EPs in a network. In some embodiments, each key policy may be associated with one or more EPs and include certain specifications (e.g., one or more of an algorithm, action, strength of the key, etc.) that define properties of an encryption/decryption key.

As described above, traditionally an SA is rekeyed based on factors including the amount of time that has passed since the SA was established or the amount of transferred data that is secured based on the security association. However, certain aspects discussed herein provide rekeying based on occurrence of one or more aperiodic events, not related to the factors discussed above, which may be beneficial to the security of the network and/or, in certain cases, an effective load balancing solution.

Accordingly, certain embodiments described herein relate to rekeying a SA based on an aperiodic trigger event. As described in relation to FIGS. 2-4, in certain embodiments, the trigger event relates to the amount of load or the number of security associations managed by a compute resource (e.g., virtual CPU, physical CPU, CPU core, etc.) that the SA is assigned to at the destination TEP. In certain such embodiments, the trigger event may be referred to as a load-balancing trigger event. Note that, in embodiments where the destination TEP is a virtual machine, the compute resource may be a virtual CPU of the virtual machine. In embodiments where the destination TEP is a physical machine or computing device, the compute resource may be a physical CPU or a CPU core of a physical CPU of the physical computing device.

Figure 5:
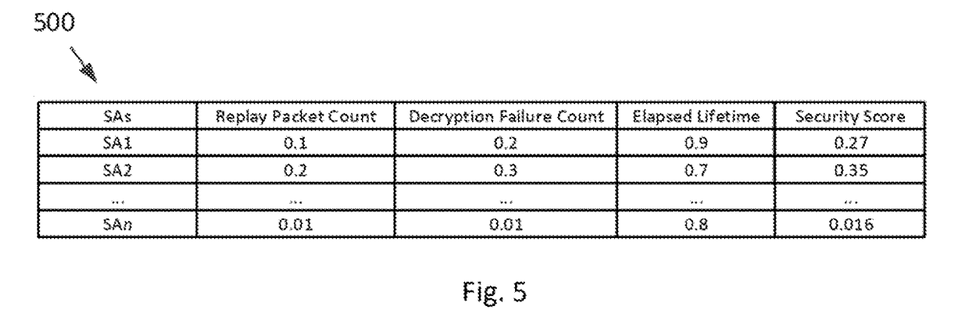
FIG. 5 illustrates an example table that is representative of information stored by a destination TEP for rekeying SAs based on security scores, according to some embodiments.

In certain other embodiments, as described in relation to FIG. 5, the trigger event relates to a security risk that the SA or the corresponding network traffic may pose to the network, including the source TEP and/or the destination TEP. In yet certain other embodiments, the trigger event may relate to an action (e.g., request, indication, input, etc.) by a user, such as a network administrator. Note that rekeying SAs based on an aperiodic trigger event, according to the embodiments described herein, may be performed by a destination TEP, regardless of whether the destination TEP is a physical or virtual machine. Accordingly, although FIG. 2 illustrates a virtual destination TEP, in certain other embodiments, a destination TEP that is configured to rekey SAs based on an aperiodic trigger event may be a physical machine.

Figure 2:
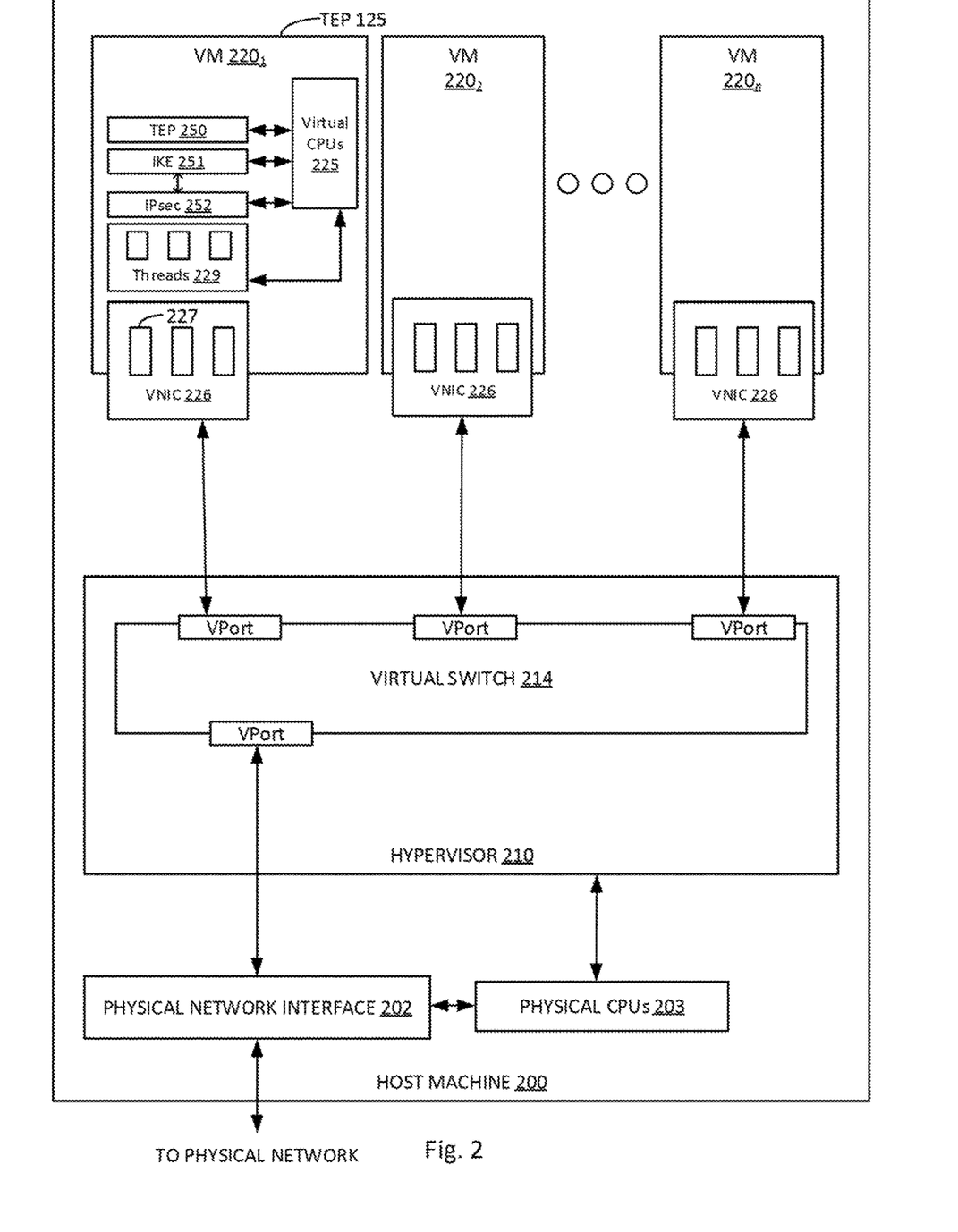
FIG. 2 illustrates an example block diagram of host machine for use in a virtualized network environment, according to some embodiments.

FIG. 2 illustrates an example block diagram of host machine 200 for use in a virtualized network environment, according to some embodiments. As illustrated, host machine 200 includes a physical network interface controller (PNIC) 202, a hypervisor 210, and a plurality of virtual machines $220_1, 220_2, \ldots 220_n$. In FIG. 2, IPSec protocols are deployed in VMs to gain the benefits of virtualization and network functions virtualization (NFV). For example, in FIG. 2, VM $220_1$ is configured to serve as a TEP, corresponding to TEP 125 of FIG. 1, as further described below. Note that, although certain embodiments are described herein with respect to VMs, the same principals and techniques may also apply to other appropriate virtual computing instances (e.g., virtual machine, container, data compute node, isolated user space instance) or physical computing devices.

Host machine 200 may provide part of the computing infrastructure in a virtualized computing environment distributed among multiple host machines. In certain embodiments, host machine 200 is a physical general purpose computer (e.g., a server, workstation, etc.) and includes one or more physical central processing units (CPUs) 203. Although not shown, in addition to physical CPUs 203, host machine 200 may also include a system memory, non-volatile data storage, as well as one or more physical network interfaces, such as PNIC 202, for communicating with other hardware computing platforms, entities, or host machines on a physical network.

Hypervisor 210 serves as an interface between virtual machines 220 and PNIC 202, as well as other physical resources (including physical CPUs 203) available on host machine 200. Each VM 220 is shown including a virtual network interface card (VNIC) 226, which is responsible for exchanging packets between VM 220 and hypervisor 210. Though shown as included in VMs 220, it should be understood that VNICs 226 may be implemented by code, such as VM monitor (VMM) code (not shown) associated with hypervisor 210. VMM code is part of host code that is provided as part of hypervisor 210, meaning that a VNIC 226 is not executed by VM 220's code, also referred to as guest code. VNICs 226 may be, in some cases, a software implementation of a PNIC and are, therefore, programmed to behave similarly as well, at least from the perspective of guest code running within VM 220. Each VM 220 is connected to a virtual port (vport) provided by virtual switch 214 through the VM's associated VNIC 226. Virtual switch 214 may serve as physical network switch, i.e., serve as an edge device on the physical network, but implemented in software. Virtual switch 214 is connected to PNIC 202 to allow network traffic to be exchanged between VMs 220 executing on host machine 200 and destinations on an external physical network.

In certain embodiments, each VNIC 226 may be configured to perform RSS. Accordingly, each VNIC 226 may be associated with a plurality of software based VNIC RSS queues 227 on VM 220. Each of the VNIC RSS queues 227 represents a memory space and may be associated with a certain virtual CPU (e.g., a different virtual CPU) from one or more virtual CPUs 225. As described in U.S. Pat. No. 10,255,091, which granted on Apr. 9, 2019 and which is incorporated herein by reference, a virtual CPU may correspond to different resources (e.g., physical CPU or execution core, time slots, compute cycles, etc.) of one or more physical CPUs 203 of host machine 200. When receiving incoming packets (e.g., not including encapsulated ESP encrypted packets), VNIC 226 may compute a hash value based on header attributes of the incoming packets and distribute the incoming packets among the VNIC RSS queues 227 associated with VNIC 226. For example, different hash values may be mapped to different VNIC RSS queues 227. Each VM 220 spawns threads 229 that are responsible for accessing incoming packets stored in RSS queues 227 and causing one or more actions (e.g., forwarding, routing, etc.) to be executed by a virtual CPU 225 on the packet.

As an example, a thread 229 may access a packet stored in an RSS queue 227 that corresponds to a certain virtual CPU 225. This certain virtual CPU 225 is then used to execute a variety of actions on the packet. Threads 229 may access the incoming packets either through polling RSS queues 227 or receiving interrupt events. Threads 229 may be configured to handle the incoming packets using a pipeline mode (e.g., multiple threads are each responsible for a different action that is performed on the packet) or a run-to-completion mode (e.g., a single thread is responsible for taking packets, one at a time, from a certain RSS queue 227 and causing a variety of actions to be performed on the packet, from start to finish).

Once a thread 229 that is scheduled on a virtual CPU 225 accesses a packet for processing, the virtual CPU 225 begins running an interrupt handler invoked by the kernel in response to an interrupt issued by VNIC 226. The virtual CPU 225 then continues with further processing the packet by performing protocol processing (unless another virtual CPU is selected, by a higher level packet steering module (e.g., Receive Packet Steering (RPS)) to handle the protocol processing).

Accordingly, using RSS, no single virtual CPU 225 is loaded with processing all incoming packets for VNIC 226. In addition, the processing of packets is distributed to different virtual CPUs 225 at the VNIC 226 and at the beginning of the processing pipeline for the packets, therefore taking advantage of distributed processing of packets at an early stage in the processing pipeline.

In some embodiments, a VM 220 is configured to perform the functions of a TEP. For example, VM $220_1$ may be configured as a TEP and include a TEP layer 250 to implement TEP functions. VM $220_1$ may implement TEP 125 of FIG. 1 and henceforth is referred to as TEP 125. TEP layer 250 refers to a set of instructions that configure TEP 125 to perform TEP functions. TEP 125 is also configured to implement IPSec or equivalent protocols and functionality using a security layer 252 ("security layer 252"). More specifically, security layer 252 encrypts outgoing packets destined for a certain destination TEP by encapsulating them with, for example, ESP headers based on a corresponding security association. In each packet's ESP header, security layer 252 also includes an SPI value, associated with the out-bound security association, that is generated by the IKE layer 251 ("IKE 251") through an IKE negotiation performed between IKE 251 and an IKE layer of, for example, a destination TEP associated with the destination EP. Security layer 252 is also configured to decrypt incoming encapsulated ESP encrypted data packets received from a source TEP. The incoming encapsulated ESP encrypted data packets are encrypted based on an in-bound security association at the source TEP. IKE 251 is responsible for performing IKE negotiations with IKE layers of other network entities to generate encryption/decryption keys and SPI values.

Further, another VM 220 executing on host machine 200, or on another host, may be configured as an EP associated with TEP 125. For example, VM 220$_2$ may be an EP associated with TEP 125. Accordingly, in some embodiments, another source EP may generate an IP packet to send to VM 220$_2$. The source EP may forward the IP packet to a source TEP, which encrypts (e.g., using a security layer, similar to security layer 252) and encapsulates (e.g., using a TEP layer, similar to TEP layer 250) the packet using an IPSec protocol (e.g., ESP tunnel mode) to generate an encapsulated ESP encrypted data packet. The source TEP then sends the encapsulated ESP encrypted data packet to destination TEP 125. The encapsulated ESP encrypted data packet is, therefore, received at virtual switch 214 of host machine 200 via PNIC 202. Virtual switch 214 sends the encapsulated ESP encrypted data packet to VNIC 226 of TEP 125.

In some cases, VNICs may be configured to perform RSS for received encapsulated ESP encrypted data packets. More specifically, VNICs may be configured to perform RSS for received encapsulated ESP encrypted data packets based on the packets' SPI values. For example, VNIC 226 of TEP 125 receives an encapsulated ESP encrypted data packet, as described above. VNIC 226 then generates (e.g., computes) a hash value (e.g., CPU core ID) based at least in part on an SPI value included in the ESP header of the encapsulated ESP encrypted data packet. For example, VNIC 226 identifies the encapsulated ESP encrypted data packet as an ESP packet based on an IP protocol number in the header of the packet indicating it is an ESP packet (e.g., equal to 50), and therefore calculates the hash value based at least in part on the SPI value.

As discussed, each SA for a pair of EPs may have a different associated SPI value. For example, destination TEP 125 may use a first SA for packets sent from a first source EP via a source TEP for VM 220$_2$, and a second SA for packets sent from a second source EP via the same source TEP for VM 220$_2$. Accordingly, even though encapsulated ESP encrypted data packets may be received at destination TEP 125 from the same source TEP and, therefore, have the same source and destination IP addresses in the new header of each of the encapsulated ESP encrypted data packets, different hash values may be calculated for the packets based at least in part on the different SPI values. In some embodiments, the hash value is further computed based on the source and/or destination IP addresses in the new header, such as to add further entropy to the hash value calculation. Subsequently, VNIC 226 assigns the encapsulated ESP encrypted data packet to one of the plurality of VNIC RSS queues 227 based on the generated hash value.

However, in certain use cases, even if the VNIC is configured to perform RSS for received encapsulated ESP encrypted data packets, e.g., by taking into account the packets' SPI values when computing hash values, it is very unlikely that a relatively uniform distribution of packets to virtual CPUs results from the RSS. For example, VNIC 226 may receive, from a single source TEP, encapsulated ESP encrypted packets with four different SPI values, each associated with a different SA established between a source EP in the physical network and a destination EP (e.g., VM 220$_2$) residing on host machine 200. However, the hash algorithm that is used by VNIC 226 may be configured such that the same hash value may be generated for all or most of the SPI values, which results in all or most of the packets being assigned to the same RSS queue 227. As a result, while hashing the SPI value improves distribution across RSS queues, especially when a relatively large number of IPsec channels are carried by the tunnel, configuring a VNIC 226 to perform RSS for encapsulated ESP encrypted data packets based on the packets' SPI values does not necessarily guarantee a reasonably fair and even distribution of the packets among virtual CPUs 225 unless there is a very large number of IPSec tunnels or many different security associations.

Accordingly, as described in further detail in U.S. application Ser. No. 16/802,580, which was filed Feb. 27, 2020 and lists inventors Wang et al. (hereinafter, "Wang") in certain embodiments, a destination TEP is configured with an ESP RSS mode to assign each incoming packet, received from a certain source EP through a source TEP, to a certain RSS queue 227 based on an identifier that is encoded in an SPI value included the packet. Wang is incorporated herein by reference herein in its entirety.

The identifier that is encoded in the SPI value may be indicated by a certain number of bits in the SPI value. The identifier may identify an RSS queue number associated with an RSS queue associated with a certain virtual CPU 225. When received by the destination TEP, an incoming encapsulated ESP encrypted packet is examined by the destination TEP to determine which RSS queue 227 the packet should be assigned to based in part or entirely on the identifier in the SPI value. In some embodiments, the identifier is encoded in the SPI value during IPSec tunnel creation performed by the destination and source TEPs. The selection of an identifier is based on a selection of a virtual CPU 225. A virtual CPU 225 is selected by the destination TEP from the plurality of virtual CPUs at the destination TEP, based on a CPU selection function. One of a variety of CPU selection functions may be used to help ensure that incoming network traffic from different source EPs, through the source TEP, is evenly distributed among virtual CPUs 225. In one example, the CPU selection function comprises a round-robin algorithm for selecting virtual CPUs 225. In another example, the CPU selection function takes into account the number of in-bound security associations assigned to each virtual CPU. In yet another example, the CPU selection function takes into account the CPU utilization of virtual CPUs 225.

By utilizing the teachings of Wang, IKE 251 is able to deterministically select a virtual CPU for processing encapsulated ESP encrypted packets associated with a certain in-bound SA (e.g., packets communicated between a certain pair of source and destination EPs). This deterministic selection of a virtual CPU also ensures that encapsulated ESP encrypted packets from the same flow are not processed out of order because they all include the same SPI value in their headers and, therefore, are assigned to and processed by the same virtual CPU.

In certain cases, even when the teachings of Wang are utilized, the balanced distribution of SAs or loads to virtual CPUs may alter and skew after a while. This imbalance, in certain cases, occurs because different SAs have different lifetimes. Some SAs may be long-lived while others, such as SAs associated with remote-access virtual private network (VPN) connections, may be more short-lived. To illustrate this with an example, if five SAs are initially assigned to a first virtual CPU and five SAs are assigned to a second virtual CPU as described in Wang, the SA distribution might later skew towards the second virtual CPU if three SAs associated with the first virtual CPU expire while all the five SAs associated with the second virtual CPU are still operating.

Accordingly, in certain embodiments, destination TEP 125 is configured to perform dynamic rebalancing of the SAs or loads associated with the different virtual CPUs 225. Destination TEP 125 may be configured to perform such rebalancing by dynamically rekeying SAs based on trigger events relating to the amount of load or the number of security associations managed by virtual CPUs 225. Rekeying an SA refers to generating a new SA with a new encryption/decryption key and SPI value. In certain embodiments of FIG. 2, SA rekeying is performed by IKE 251. By changing the SPI value associated with an SA, IKE 251 is able to deterministically migrate or reassign the SA from an "overloaded" virtual CPU 225 to a less utilized virtual CPU 225.

Figure 3:
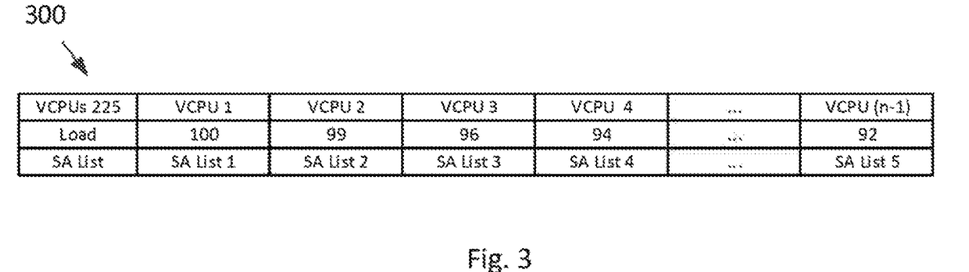
FIG. 3 illustrates an example table that is representative of information stored by a destination TEP for load balancing, according to some embodiments.

In certain embodiments, IKE 251 is configured to rebalance virtual CPUs 225 based on the amount of load assigned to each of virtual CPUs 225. FIG. 3 illustrates an example table 300 that is representative of information, such as a data structure, that IKE 251 may use to rebalance virtual CPUs 225, which are shown as virtual CPU 1 through virtual CPU (n−1) in table 300. IKE 251 is configured to periodically refresh this information, for example, based on a configurable duration. As shown, table 300 includes a list of virtual CPUs 1 through (n−1), each having a load as well as a list of SAs. In certain embodiments, the load indicated for each virtual CPU corresponds to the average CPU load computed over the latest polling period. A polling period is a period during which CPU utilization information about each virtual CPU is polled. In certain embodiments, CPU utilization polling is performed by security layer 252. The results of the polling are then shared by security layer 252 with IKE 251 (e.g., through a communication channel established between the two layers).

In certain embodiments, the load indicated for each virtual CPU is a positive integer between '0' to '100,' where a virtual CPU having a load of '0' corresponds to a virtual CPU that is not utilized at all. On the other hand, a virtual CPU having a load of '100' corresponds to a virtual CPU that is fully utilized. In certain embodiments, IKE 251 is configured to sort the data structure, comprising the information shown in Table 300, based on the amount of load assigned to the virtual CPUs. For example, as shown in FIG. 3, the information in table 300 is sorted such that virtual CPU 1 has the highest amount of load while virtual CPU (n−1) is assigned the least amount of load. In other words, table 300 shows an example of a situation where loads are distributed unevenly between the virtual CPUs. Table 300 also shows a list of SAs for each of the virtual CPUs. The list of SAs associated with a certain virtual CPU corresponds to SAs that are served by the virtual CPU.

In order to rebalance virtual CPUs 1 through (n−1), in certain embodiments, IKE 251 is configured to select an SA from a heavily utilized virtual CPU (also referred to as a source virtual CPU) and migrate the SA to a less utilized virtual CPU (also referred to as a target virtual CPU). For example, in certain embodiments, IKE 251 is configured to migrate tunnel connection from the virtual CPU that is utilized the most, as compared to other virtual CPUs, to a virtual CPU that is utilized the least. In the example of FIG. 3, the virtual CPU that is utilized the most is virtual CPU 1 and the virtual CPU that is utilized the least is virtual CPU (n−1). Note that, in certain embodiments, the source virtual CPU may not be the virtual CPU with the highest amount of load assigned thereto. Similarly, in certain embodiments, the target virtual CPU may not be the virtual CPU with the lowest amount of load assigned thereto.

Continuing with the example above, IKE 251 selects an SA from SA List 1 of virtual CPU 1 for migration to virtual CPU (n−1). In certain embodiments, IKE 251 is configured to randomly select an SA from SA List 1. Each SA List is a list of SAs assigned to the corresponding VCPU, and each SA in the SA List corresponds to a "live" encrypted tunnel connection. In certain other embodiments, IKE 251 is configured to select an SA from SA List 1 based on a SA selection algorithm. For example, the algorithm may be a LIFO (last one in, first one out) algorithm, such that by using the algorithm, IKE 251 would be configured to select the newest SA from SA List 1 (e.g., most recently established SA) for migration. In certain other embodiments, the algorithm configures IKE 251 to select the SA, from SA List 1, with the highest amount of load. For example, IKE 251 may be configured to sort the SAs in SA List 1 and then find the SA with the highest amount of load (e.g., highest amount of incoming network traffic). Alternatively, an SA selection algorithm may identify an SA corresponding most closely to a target amount of incoming network traffic for transferring a target amount of load between VCPUs In certain embodiments, once an SA is selected, IKE 251 is configured to "migrate" the SA to the target virtual CPU only when migrating the SA would not cause a ripple effect. The "migration" may involve generating a new SA for the tunnel connection, wherein the new SA has a SPI value associated with the target virtual CPU. As an example, a ripple effect is caused, for example, when the migration of the SA to the target virtual CPU causes the target virtual CPU to be the highest utilized virtual CPU, thereby, causing IKE 251 to migrate back the SA to the source virtual CPU, and so on. Such a situation may cause the SA to be migrated back and forth between the source virtual CPU and the target virtual CPU. As such, in certain embodiments, IKE 251 is configured to migrate the SA to the target virtual CPU only when the following condition ("load-based ripple effect condition") is met:

$$\text{Load of source virtual CPU} > \text{Load of target virtual CPU} + 2*\text{EPG}$$

Load of the source virtual CPU refers to the average load managed by the source virtual CPU based on the latest polling period. Load of the target virtual CPU refers to the average load managed by the target virtual CPU based on the latest polling period. The EPG (expected performance gain), refers to the amount of load consumed by the SA that has been selected as a potential candidate for migration. Instead of '2,' in certain other embodiments, another multiple may be selected for EPG. However, the multiplier may not be less than '2,' otherwise migrating the selected SA may cause the ripple effect discussed above.

To illustrate this formula with an example, IKE 251 may select an SA from SA List 1 (e.g., using the SA selection algorithm described above), as a potential candidate for migration. The EPG or load associated with the SA may be '5.' Accordingly, in such an example the load-based ripple effect condition above is not met because:

$$100(\text{load of virtual CPU 1}) < 92(\text{load of virtual CPU } (n-1)) + 2*5$$

In other words, migrating the candidate SA from virtual CPU 1 to virtual CPU (n−1) would cause virtual CPU (n−1) to have a load of 97 and virtual CPU 1 to have a load of 95, which would cause a ripple effect as described above. As such, in this example, IKE 251 may determine that this SA does not meet the load-based ripple effect condition for migration and choose another SA in SA List 1.

In a different example, where, in contrast to the example above, the SA selected from SA List 1 has a load of '1', then the load-based ripple effect condition above is met and IKE 251 migrates the SA to virtual CPU (n−1). After such a migration, IKE 251 may examine the data structure associated with table 300 again to select a source virtual CPU and a target virtual CPU. Note that, at the time IKE 251 performs this next examination of the data structure, in certain embodiments, the data structure may have been refreshed as compared to when IKE 251 selected the SA that was migrated to virtual CPU (n–1).

In certain embodiments, the trigger event for rekeying an SA corresponds to the load-based ripple effect condition, described above, being met for an SA. In certain embodiments, IKE 251 periodically checks whether the load-based ripple effect condition is met for each SA starting with an SA selected from, for example, a source virtual CPU (e.g., virtual CPU 1) managing a higher amount of load than other one or more virtual CPUs.

Figure 4:
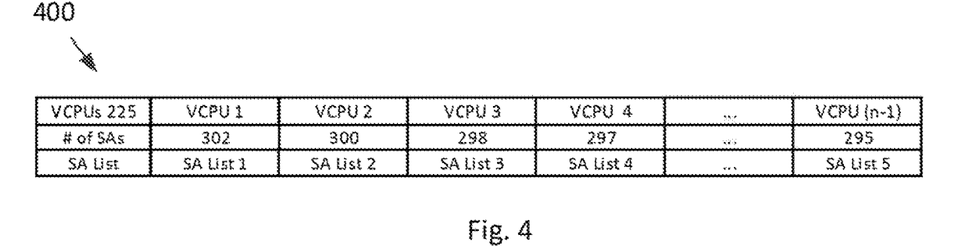
FIG. 4 illustrates an example table that is representative of information stored by a destination TEP for load balancing, according to some embodiments.

In certain embodiments, IKE 251 is configured to rebalance virtual CPUs 225 based on the number of SAs assigned to each of virtual CPUs 225. FIG. 4 illustrates an example table 400 that is representative of information, such as a data structure, that IKE 251 may use to rebalance virtual CPUs 225, which are shown as virtual CPU 1 through virtual CPU (n–1) in table 400. As shown, in certain embodiments, IKE 251 is configured to sort the data structure, comprising the information shown in Table 400, based on the number of SAs assigned to the virtual CPUs 1 through (n–1). For example, virtual CPU 1 has the highest number of SAs assigned thereto while virtual CPU (n–1) has the lowest number of SAs assigned thereto.

Table 400 also shows a list of SAs for each of the virtual CPUs. The list of SAs associated with a certain virtual CPU corresponds to SAs that are served by the virtual CPU. In certain embodiments, IKE 251 is configured to periodically refresh the information represented by table 400, for example, based on a configurable duration. The number of SAs indicated for each virtual CPU is an integer number that may, for example, correspond to the average number of SAs assigned to the virtual CPU over the latest polling period.

In certain embodiments, IKE 251 may utilize one of the same SA selection formulas described above in relation to rebalancing virtual CPUs 1 through (n–1) based on the amount of load assigned thereto. Once an SA is selected, in certain embodiments, IKE 251 is configured to migrate an SA from a source virtual CPU (e.g., virtual CPU 1) to a target virtual CPU (e.g., virtual CPI (n–1)) only when migrating the SA would not cause a ripple effect. As such, in certain embodiments, IKE 251 is configured to migrate the SA to a target virtual CPU only when the difference between the number of SAs assigned to the source virtual CPU and the number of SAs assigned to the target virtual CPU exceeds '2' (hereinafter referred to as an "SA-based ripple effect condition"). Although the example discussed above relates to migrating an SA from source virtual CPU 1 to target virtual CPU (n–1), note that in certain embodiments, the source virtual CPU may not be the virtual CPU with the highest number of SAs assigned thereto. Similarly, in certain embodiments, the target virtual CPU may not be the virtual CPU with the lowest amount of SAs assigned thereto.

In certain embodiments, the trigger event for rekeying an SA corresponds to the SA-based ripple effect condition, described above, being met. In certain embodiments, IKE 251 periodically checks whether the SA-based ripple effect condition is met by comparing the number of SAs assigned to a source virtual CPU (e.g., virtual CPU 1) and a target virtual CPU (e.g., virtual CPU (n–1)).

As described in Wang, migrating an SA to a target virtual CPU (n–1) (e.g., one of virtual CPUs 225) in a deterministic manner involves using IKE 251 to rekey the SA to generate a new SPI value, at least in part, including in the SPI value an identifier that identifies an RSS queue number of an RSS queue associated with the target virtual CPU (n–1) at TEP 125. Rekeying the SA may also involve IKE 251 renegotiating a new encryption/decryption key for the SA with an IKE layer at TEP 115. After IKE 251 generates the new SPI value and encryption/decryption key, IKE 251 establishes a new or replacement SA with TEP 115 using the new SPI value as well as the encryption/decryption key. This newly established SA may be used for securing network traffic, between the same two EPs (e.g., EP 110 and EP 120), that the previous SA was used to secure. After the new SA is established, TEP 115 proceeds to inject the new SPI value in packets encrypted based on the new SA (e.g., using the new encryption/decryption key). When received at TEP 125, the packets are then processed by the target virtual CPU based on the SPI value.

Note that the embodiments described herein relating to configuring destination TEP 125 to perform dynamic rebalancing of the SAs or loads associated with the different virtual CPUs 225 may be utilized even when identifiers are not used in the SPI value to deterministically assign SAs to certain virtual CPUs, as described in Wang. To illustrate this with an example, based on table 300, destination TEP 125 may determine that virtual CPU 1 is overloaded and select an SA to be reassigned. In such an example, destination TEP 125 may rekey the SA by generating a new random SPI value without including any identifier in the SPI value. In other words, instead of including an identifier in the new SPI value to deterministically assign the replacement SA to a certain target virtual CPU, in that example, destination TEP 125 generates a random SPI value.

In that case, because the SPI value includes only random bits, the corresponding incoming packets received at destination TEP 125, may be hashed by the VNIC 226 to any of one of RSS queues 227 associated with one of virtual CPUs 1 through virtual CPU (n–1). If the SPI value happens to hash to virtual CPU (n–1), rekeying the SA may be considered a success because virtual CPU (n–1) manages the least amount of load out of all virtual CPUs 225. A somewhat less successful result may be achieved if the SPI value happens to hash to a virtual CPU other than virtual CPU 1 and virtual CPU (n–1). However, if the random SPI value happens to hash to an RSS queue that corresponds to virtual CPU 1, the rekeying may be considered as completely unsuccessful because it resulted in reassigning the SA to the same virtual CPU, i.e., virtual CPU 1.

Note that the computer architecture shown in FIG. 2 of the present disclosure is merely provided as an example and that the embodiments described above can be performed by a destination TEP that includes a physical computing device with physical CPUs. In certain such embodiments, information similar to the information represented by table 300 or table 400 may be stored by the destination TEP about the physical CPUs and/or CPU cores of the destination TEP.

As described above, in certain embodiments, the trigger event relates to a security risk that the SA or the corresponding network traffic may pose to the network, including the source TEP 115 and/or the destination TEP 125.

FIG. 5 illustrates a table 500 that is representative of information, e.g., a data structure, stored at or accessed by destination TEP 125 for monitoring the security risk posed by each of a plurality of security associations SA1-SAn established between source TEP 115 and destination TEP 125. In certain embodiments, the security risk posed by each of the plurality of security associations SA1-SAn is determined using a security score. As shown in FIG. 5, in certain embodiments, a security score is calculated for each SA based on a corresponding number of replay packets received at destination TEP 125, a corresponding number of decryption failures at destination TEP 125, and/or the amount of time that has passed since the SA was established. In certain embodiments, a security score is calculated based on additional or different factors. For example, in certain embodiments, the security score is at least in part based on an external security entity or software application. For example, the external security entity or software application may execute separately from security layer 252.

The corresponding number of replay packets received at destination TEP 125 refers to the number of packets that (1) were encrypted based on the SA such that each included the SA's corresponding SPI value and (2) include the same sequence number. As described above, the SA maintains sequence numbers for each data transfer to ensure anti-replay. A count for the number of replay packets may be determined over a certain time period. In one example, the time period may cover the amount of time between when the SA was established and the present. In another example, the time period may correspond to a shorter time period (e.g., last few minutes, hours, days, etc.).

The corresponding number of decryption failures at destination TEP 125 refers to the number of packets that (1) were encrypted based on the SA such that each included the SA's corresponding SPI value and (2) destination TEP 125 failed to decrypt. A count for the number of decryption failures may be determined over a certain time period. In one example, the time period may cover the amount of time between when the SA was established and the present. In another example, the time period may correspond to a shorter time period (e.g., last few minutes, hours, days, etc.).

In certain embodiments, destination TEP 125 is configured to sort the SAs based on their security scores. Table 500 is representative of SA1-San, which are sorted based on their corresponding security scores. For example, SA1 has the highest security score while SAn has the lowest security score. In certain embodiments, destination TEP 125 is configured to periodically refresh the information represented by table 500, meaning that the security scores therein are real-time scores. In certain embodiments, destination TEP 125 is also configured to periodically monitor the security score associated with each SA to determine whether the security score exceeds a certain defined threshold. In certain embodiments, the destination TEP 125 is configured to periodically begin making such a determination about each SA's security score by first starting with the SA with the highest security score based on a sorted list of SAs. If a security score associated with a SA exceeds the threshold, destination TEP 125 may trigger a rekey of the SA. In such embodiments, as described above, rekeying of the SA includes generating a new SPI value as well as encryption/decryption key.

In certain embodiments, implementing the techniques described herein relating to rekeying SAs, based on the corresponding security scores, may provide additional security to a destination TEP 125 that is also configured to deterministically assign SAs to virtual CPUs, as described in Wang. In such embodiments, once an SA is selected for rekeying based on its security score exceeding a threshold, destination TEP 125 then selects a target virtual CPU to assign the replacement SA to. In certain embodiments, the target virtual CPU may be the same virtual CPU that the old SA was assigned to. In such embodiments, destination TEP 125 includes an identifier associated with an RSS queue number of the RSS queue associated with the virtual CPU in the new SPI value. In certain other embodiments, the target virtual CPU may be different than the virtual CPU that the old SA was assigned to. In such embodiments, destination TEP 125 may select the target virtual CPU based on the amount of load assigned to each of the virtual CPUs. For example, destination TEP 125 may use a CPU selection function that is based on the amount of load or the number of SAs associated to each of the virtual CPUs. In such an example, destination TEP 125 may select a target virtual CPU that is not as overloaded as one or more of the other virtual CPUs.

In certain embodiments, the techniques described herein relating to rekeying SAs based on the corresponding security scores may provide additional security to destination TEP 125 even if destination TEP 125 is not configured to deterministically assign SAs to virtual CPUs, as described in Wang. In such embodiments, once an SA is selected for rekeying based on its security score exceeding a threshold, destination TEP rekeys the SA by generating a new encryption/decryption key as well as a new random SPI value, which may hash to any of the virtual CPUs 225. In certain embodiments, the techniques described herein relating to rekeying SAs based on the corresponding security scores may provide additional security to a destination TEP that includes a physical computing device with physical CPUs.

In addition to rekeying an SA based on a corresponding security score or the amount of load or the number of SAs assigned to the compute resource that the SA is assigned to, in certain embodiments, a destination TEP may rekey an SA based on a request received from an administrator. In certain such embodiments, and in the example of FIG. 2, IKE 251 may receive an indication from a local controller (not shown) that executes as part of hypervisor 210. The local controller is able to receive the administrator's indication from a control plane that is in communication with a management plane that the administrator is able to interface with.

Figure 6:
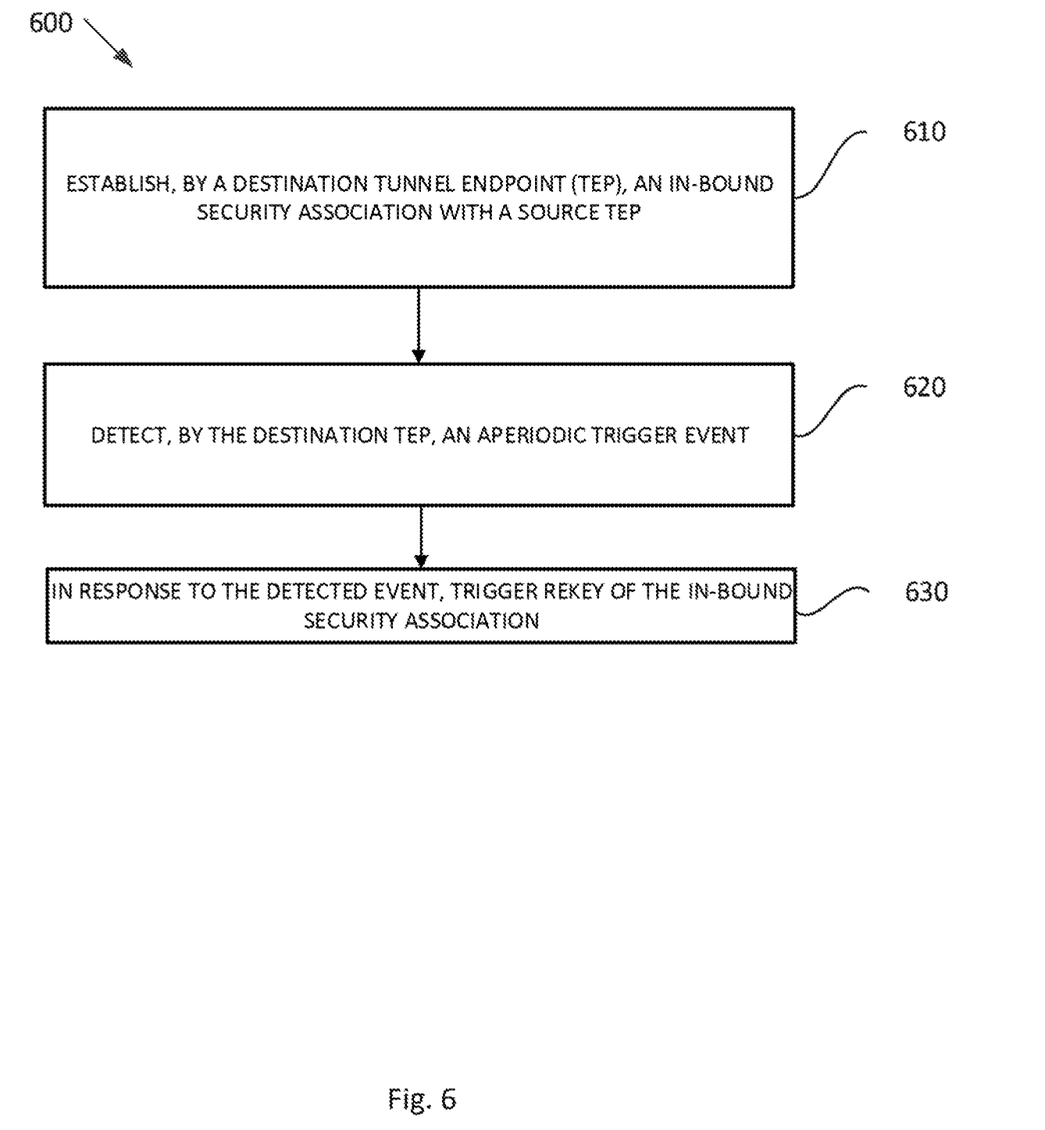
FIG. 6 illustrates example operations for use by a destination TEP to rekey an in-bound SA based on a trigger event, according to some embodiments

FIG. 6 illustrates example operations 600 for use by a destination TEP to rekey an in-bound SA based on a trigger event, according to some embodiments. In certain embodiments of operations 600, the destination TEP is TEP VM 220₁, which is TEP 125 of FIG. 1, the source TEP is TEP 115, the source EP is EP 110 and the destination EP is VM 220₂, which is EP 120 of FIG. 1. In other examples, the destination and source TEPs may be physical computing devices.

At block 610, a destination TEP establishes an in-bound SA with a source TEP. For example, TEP 125 establishes an in-bound SA with TEP 115 with a first SPI value, for encrypting data packets communicated between TEP 125 and TEP 115, and a first encryption/decryption key. In certain embodiments, the SA is established for encrypting packets generated by EP 110 and destined for VM 220₂. In such embodiments, TEP 115 receives the packets from EP 110, encrypts them using the encryption key associated with the in-bound security association, and also includes the SPI value in the ESP headers of the packets. TEP 115 then transmits the encapsulated ESP encrypted packets to TEP 125, which receives the packets and uses security layer 252 to decrypt and de-capsulate the packets. TEP 125 then transmits the packets to VM 220₂.

At block 620, the destination TEP detects an aperiodic trigger event. As described above, the trigger event may be associated with a real-time security score of the in-bound security association, the number of security associations assigned to a compute resource (e.g., virtual CPU) that the in-bound security association is assigned to, the amount of load managed by the compute resource that the in-bound security association is assigned to, and/or an indication received from an administrator.

At block 630, in response to the detected event, the destination TEP triggers rekey of the in-bound security association. In response to the triggering, TEP 125 rekeys the in-bound security association, the rekeying including generating a second SPI value for replacing the first SPI value. For example, TEP 125 rekeys the in-bound SA by engaging in SA negotiations with TEP 115 using IKE 251. The rekeying includes generating a new second SPI value as well as a new encryption/decryption key to replace the first SPI value and the first encryption/decryption key, respectively.

As described above, in certain embodiments, TEP 125 is configured to deterministically assign in-bound SAs to virtual CPUs of TEP 125, in which case, TEP 125 includes an identifier of the target virtual CPU in the new second SPI value. In certain other embodiments, the new second SPI value is random and does not include an identifier of any target virtual CPU, meaning that incoming packets associated with the replacement SA may be randomly assigned to any one of the virtual CPUs based on the VNIC 226's RSS hashing algorithm.

Next, the destination TEP establishes a replacement SA with the source TEP using the new second encryption/decryption packet and the new second SPI value. For example, TEP 125 establishes a new SA with TEP 115 using the new second encryption/decryption packet and the new second SPI value. This newly established SA may be used for securing network traffic, between the same two EPs (e.g., EP 110 and EP 120), that the previous SA was used to secure Subsequently, the destination TEP receives an encapsulated ESP encrypted packet from the source TEP. For example, TEP 125 receives an encapsulated ESP encrypted packet from TEP 115. The encapsulated ESP encrypted packet is encrypted by TEP 115 based on the rekeyed in-bound security association, using the new encryption/decryption key. The encapsulated ESP encrypted packet also includes the new second SPI value.

The destination TEP processes the encrypted packet based on the second SPI value. In certain embodiments of FIG. 2, the encapsulated ESP encrypted packet is received at VNIC 226, hashed to one of the RSS queues 227 based on the second SPI value, and accessed by a thread 229 that is scheduled on a virtual CPU 225 corresponding to the RSS queue that the packet hashed to.

In some embodiments, instead of using IKE 251 to generate encryption/decryption keys and SPI values, TEP 125 may receive an encryption/decryption key as well as an SPI value from a DNE controller (e.g., server 140). For example, the DNE controller may rekey SAs based on the trigger events described above and transmit the new SPI value to both TEP 125 and TEP 115 for use in establishing the in-bound SA utilized for encrypting packets transmitted from EP 110 to EP 120. In some embodiments, the DNE controller may be configured by all instructions necessary for implementing the embodiments described herein.

In host machine 200, processing unit(s) may retrieve instructions to execute and data to process in order to execute the processes discussed herein. The processing unit(s) may be a single processor or a multi-core processor in different embodiments. The read-only-memory (ROM) may store static data and instructions that may be utilized by the processing unit(s) and other modules of the electronic system. The permanent storage device, on the other hand, may be a read-and-write memory device. The permanent storage device may be a non-volatile memory unit that stores instructions and data even when the host machine is off. Some embodiments use a mass-storage device (such as a magnetic or optical disk and its corresponding disk drive) as the permanent storage device.

Some embodiments use a removable storage device (such as a floppy disk, flash drive, etc.) as the permanent storage device. Like permanent storage device, the system memory may be a read-and-write memory device. However, unlike permanent storage device, the system memory may be a volatile read-and-write memory, such as a random access memory (RAM). The system memory may store some of the instructions and data that processing unit(s) utilize at runtime. In some embodiments, processes discussed herein are stored in the system memory, the permanent storage device, and/or the read-only memory.

Certain embodiments as described above involve a hardware abstraction layer on top of a host computer. The hardware abstraction layer allows multiple contexts or virtual computing instances to share the hardware resource. In some embodiments, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs.

It should be noted that these embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

In the above description, for purposes of explanation, numerous examples and specific details are set forth in order to provide a thorough understanding of embodiments of the present disclosure. Some embodiments as expressed in the claims may include some or all of the features in these examples, alone or in combination with other features described below, and may further include modifications and equivalents of the features and concepts described herein. Note that some explanations herein may reflect a common interpretation or abstraction of actual processing mechanisms. Some descriptions may therefore abstract away complexity and explain higher level operations without burdening the reader with unnecessary technical details of well understood mechanisms. Such abstractions in the descriptions herein should construed as inclusive of the well understood mechanisms.

What is claimed is:

1. A method for dynamically rekeying a security association, comprising:
   establishing, by a destination tunnel endpoint (TEP), an in-bound security association with a source TEP, with a first security parameter index (SPI) value, for encrypting data packets communicated between the source TEP and the destination TEP;
   rekeying, by the destination TEP, the in-bound security association, the rekeying including generating a second SPI value for replacing the first SPI value based on a trigger event relating to at least one of:
      a real-time security score of the in-bound security association, wherein the real-time security score is based at least on a number of replay packets having the first SPI value that are received by the destination TEP or a number of times the destination TEP failed to decrypt encrypted packets including the first SPI value,
      a number of security associations assigned to a compute resource that the in-bound security association is assigned to, or
      a determination that the compute resource that the in-bound security association is assigned to has a highest amount of load of a plurality of compute resources;
   receiving an encrypted packet from the source TEP, wherein the encrypted packet includes the second SPI value; and
   processing, by the destination TEP, the encrypted packet based on the second SPI value.

2. The method of claim 1, wherein the real-time security score is based further on:
   an amount of time that has passed since the in-bound security association was established.

3. The method of claim 1, wherein, prior to the rekeying:
   the trigger event relates to the number of security associations assigned to the compute resource that the in-bound security association is assigned to being higher than a number of security associations assigned to an additional compute resource, and
   the second SPI value is associated with the additional compute resource.

4. The method of claim 3, wherein the trigger event relates to the number of security associations assigned to the compute resource that the in-bound security association is assigned to being higher than the number of security associations assigned to the other compute resource by at least two.

5. The method of claim 1, wherein prior to the rekeying:
the trigger event relates to an amount of load managed by the compute resource that the in-bound security association is assigned to being higher than an amount of load managed by an additional compute resource at the destination TEP, and
the second SPI value is associated with the additional compute resource.

6. The method of claim 5, wherein the trigger event relates to the amount of load managed by the compute resource that the in-bound security association is assigned to being higher than the amount of load managed by the other compute resource at the destination TEP by at least two times an amount of load associated with the in-bound security association prior to the rekeying.

7. The method of claim 1, wherein the trigger event relates to the real-time security score of the in-bound security association.

8. The method of claim 1, wherein the trigger event relates to at least one of:
the number of security associations assigned to the compute resource that the in-bound security association is assigned to, or
the determination that the compute resource that the in-bound security association is assigned to has the highest amount of load of the plurality of compute resources.

9. The method of claim 1, wherein the trigger event relates to the number of security associations assigned to the compute resource that the in-bound security association is assigned to.

10. The method of claim 1, wherein the trigger event relates to the determination that the compute resource that the in-bound security association is assigned to has the highest amount of load of the plurality of compute resources.

11. A computer system, comprising:
a memory comprising executable instructions; and
a processor in data communication with the memory and configured to execute the instructions to cause the computer system to:
establish, by a destination tunnel endpoint (TEP), an in-bound security association with a source TEP, with a first security parameter index (SPI) value, for encrypting data packets communicated between the source TEP and the destination TEP;
rekey, by the destination TEP, the in-bound security association, the rekeying including generating a second SPI value for replacing the first SPI value based on a trigger event relating to at least one of:
a real-time security score of the in-bound security association, wherein the real-time security score is based at least on a number of replay packets having the first SPI value that are received by the destination TEP or a number of times the destination TEP failed to decrypt encrypted packets including the first SPI value,
a number of security associations assigned to a compute resource that the in-bound security association is assigned to, or
a determination that the compute resource that the in-bound security association is assigned to has a highest amount of load of a plurality of compute resources;

receive an encrypted packet from the source TEP, wherein the encrypted packet includes the second SPI value; and
process, by the destination TEP, the encrypted packet based on the second SPI value.

12. The computer system of claim 11, wherein the real-time security score is based further on:
an amount of time that has passed since the in-bound security association was established.

13. The computer system of claim 11, wherein prior to the rekeying:
the trigger event relates to the number of security associations assigned to the compute resource that the in-bound security association is assigned to being higher than a number of security associations assigned to an additional compute resource, and
the second SPI value is associated with the additional compute resource.

14. The computer system of claim 13, wherein the trigger event relates to the number of security associations assigned to the compute resource that the in-bound security association is assigned to being higher than the number of security associations assigned to the other compute resource by at least two.

15. The computer system of claim 11, wherein prior to the rekeying:
the trigger event relates to an amount of load managed by the compute resource that the in-bound security association is assigned to being higher than an amount of load managed by an additional compute resource at the destination TEP, and
the second SPI value is associated with the additional compute resource.

16. The computer system of claim 15, wherein the trigger event relates to the amount of load managed by the compute resource that the in-bound security association is assigned to being higher than the amount of load managed by the other compute resource at the destination TEP by at least two times an amount of load associated with the in-bound security association prior to the rekeying.

17. A non-transitory computer readable medium having instructions stored thereon that, when executed by a computer system, cause the computer system to perform a method comprising:
establishing, by a destination tunnel endpoint (TEP), an in-bound security association with a source TEP, with a first security parameter index (SPI) value, for encrypting data packets communicated between the source TEP and the destination TEP;
rekeying, by the destination TEP, the in-bound security association, the rekeying including generating a second SPI value for replacing the first SPI value based on a trigger event relating to at least one of:
a real-time security score of the in-bound security association, wherein the real-time security score is based at least on a number of replay packets having the first SPI value that are received by the destination TEP or a number of times the destination TEP failed to decrypt encrypted packets including the first SPI value,
a number of security associations assigned to a compute resource that the in-bound security association is assigned to, or
a determination that the compute resource that the in-bound security association is assigned to has a highest amount of load of a plurality of compute resources;

receiving an encrypted packet from the source TEP, wherein the encrypted packet includes the second SPI value; and processing, by the destination TEP, the encrypted packet based on the second SPI value.

18. The non-transitory computer readable medium of claim 17, wherein the real-time security score is based further on:
an amount of time that has passed since the in-bound security association was established.

19. The non-transitory computer readable medium of claim 17, wherein, prior to the rekeying:
the trigger event relates to the number of security associations assigned to the compute resource that the in-bound security association is assigned to being higher than a number of security associations assigned to an additional compute resource, and
the second SPI value is associated with the additional compute resource.

20. The non-transitory computer readable medium of claim 19, wherein the trigger event relates to the number of security associations assigned to the compute resource that the in-bound security association is assigned to being higher than the number of security associations assigned to the other compute resource by at least two.

21. The non-transitory computer readable medium of claim 17, wherein prior to the rekeying:
the trigger event relates to an amount of load managed by the compute resource that the in-bound security association is assigned to being higher than an amount of load managed by an additional compute resource at the destination TEP, and
the second SPI value is associated with the additional compute resource.

22. The non-transitory computer readable medium of claim 21, wherein the trigger event relates to the amount of load managed by the compute resource that the in-bound security association is assigned to being higher than the amount of load managed by the other compute resource at the destination TEP by at least two times an amount of load associated with the in-bound security association prior to the rekeying.

23. The non-transitory computer readable medium of claim 17, wherein the trigger event relates to the real-time security score of the in-bound security association.

24. The non-transitory computer readable medium of claim 17, wherein the trigger event relates to at least one of:
the number of security associations assigned to the compute resource that the in-bound security association is assigned to, or
the determination that the compute resource that the in-bound security association is assigned to has the highest amount of load of the plurality of compute resources.

* * * * *